Patented Oct. 9, 1928.

1,687,228

UNITED STATES PATENT OFFICE.

HUGH S. REID AND WALDO C. HOVEY, OF SHAWINIGAN FALLS, QUEBEC, CANADA, ASSIGNORS TO CANADIAN ELECTRO PRODUCTS COMPANY, LIMITED, OF MONTREAL, QUEBEC, CANADA.

PROCESS OF MANUFACTURING ACETALDEHYDE.

No Drawing.   Application filed December 21, 1922.   Serial No. 608,335.

This invention relates to an improved process for the production of acetaldehyde, and more particularly to a process in which acetylene and water are combined in presence of suitable catalytic agents.

The primary object of the invention is to provide a process which will give an extremely high rate of production and nearly quantitative yield, and further to provide a process which may be carried out in a continuous manner.

A further object is to provide a process which may be carried out without excessive destruction of commercial apparatus or excessive destruction of catalyst.

Still another object is to provide a process such that the reaction may be very readily controlled.

It is known that acetaldehyde may be prepared commercially by passing acetylene gas into an aqueous solution of acids, such as sulphuric, phosphoric or acetic acids, and containing as catalyst certain salts or oxides of mercury. It has also been proposed to supply acetylene gas in excess of the combinable rate, the escaping excess serving to remove the acetaldehyde as formed from the acidulated liquor. If only a small amount of acetylene is supplied, relatively to the reaction liquor, a very considerable proportion will be absorbed but the ratio of acetylene absorbed to the amount of liquor, per time unit, will be very low. Also, the efficiency of the process will be low owing firstly to decomposition of the catalyst by prolonged contact with the aldehyde, and secondly to the polymerization of the aldehyde by the acid. This condition led to the practice of increasing the acetylene supply until the escaping excess was sufficient to carry off the aldehyde. Improvements in the yields which thereby resulted were attributed in part to the preservation of the catalyst and to the avoidance of polymerization and tar formation. With this increased rate of acetylene circulation the proportion absorbed is materially lower and it would seem that further increase in the acetylene supply beyond that necessary to carry off the aldehyde would be profitless. As far as can be determined from the literature on the subject, the excess of acetylene employed has not been very great, being limited to that necessary to entrain the aldehyde and remove it from contact with the reaction liquor. For this purpose an excess of less than 100% may be sufficient. It has now been discovered that, while increases in the rate of acetylene supply are accompanied by notable decreases in the proportion absorbed, there is also a very great increase in the rate of absorption based on the amount of reaction liquor and on the amount of catalyst. It has further been discovered that when circulating acetylene at a rate greatly in excess of the absorption rate, acid concentrations higher than heretofore practicable can be employed without appreciable resin or tar formation and also the catalyst is more slowly reduced.

According to this invention acetaldehyde is produced by passing acetylene gas into aqueous acid solutions containing a suitable catalyst, the acetylene being passed into the liquor at a rate very greatly in excess of the rate of absorption. The term "very greatly" is here used as indicating amounts over 300% to 400% excess. By reason of the great excess of acetylene the rate of reaction is materially increased, so that using a given amount of reaction liquor a materially greater yield of aldeyhde may be obtained in a given time than when an excess of acetylene is only sufficient to carry off the formed aldehyde.

The use of a great excess of acetylene enables acid solutions of concentrations higher than ordinary to be used without any appreciable resin formation, and this in itself serves to increase the rate of reaction. The great excess of acetylene further enables more than ordinary contact to be obtained between the acetylene and the catalytic material and by the use of a great current of acetylene serves to keep the liquor in violent agitation and to keep the catalyst thoroughly in suspension in the liquor. As a result of the violent agitation and excellent suspension of the catalyst, the rate of reaction is greatly increased. When a sufficiently great excess of acetylene is employed it is found practical to dispense entirely with mechanical agitation, thus enabling the apparatus to be simplified and the cost of installation and operation to be correspondingly reduced.

The great afflux of acetylene and acetaldehyde vapor removes the heat of reaction which will be absorbed in condensing out the acetaldehyde. The increased production of acetaldehyde demands an increased influx of water, to replace that combined and carried off by the acetylene in vaporous or in atomized condition, if the volume of reaction liquor is to be kept constant, and this added water serves also to cool the reaction. Any further cooling that may be necessary can be effected in any well known manner. Within limits the rate of reaction is dependent upon the temperature and therefore such supplementary cooling may be employed to govern the rate of reaction by regulating the temperature. The rate of acetylene admission may also be regulated to largely or wholly control the reaction.

While the use of a great excess of acetylene lends itself peculiarly to a continuous process, it will be understood that it may also be applied to a batch process.

It will be understood that the feature of using a great excess of acetylene is not dependent on the use of any particular catalytic substances or temperatures of reaction or upon the continuity of the process, and it must therefore be borne in mind that the following example is merely illustrative and not in any way limitative.

*Example.*

In a vessel of suitable material having an inverted conical bottom and of a capacity of 2000 gals., there is introduced 1000 gals. of an aqueous 20% sulphuric acid solution. 20 lbs. (dry weight) of neutral or slightly acid mercurous sulphate is introduced as an initial charge. Acetylene gas is passed in at the apex of the inverted conical bottom at the rate of, say, 2000 cu. ft. per minute and bubbles up through the liquid maintaining the same in violent agitation and also maintaining the mercury catalyst in practically perfect suspension. The temperature is preferably maintained at between 50° C. and 85° C. but may be allowed to rise within any limit determined by the explosion hazard and the liability of formation of resinous or other undesirable bodies. The temperature may also be allowed to drop or may be maintained lower than that specified by suitable cooling, the lower limit being in reality that at which the reaction ceases. If the temperature of reaction approaches the boiling point of the acid solution it would be advisable or necessary to maintain super-atmospheric pressure, for example, by the use of a loaded outlet valve, in order to avoid boiling away the water. Water is added as necessary to replace that which combines with the acetylene and any which may be entrained by the efflux of acetylene and which amount can be determined by calculation, by liquid lever gauge or otherwise. The reaction liquor should be tested at intervals and water and mercurous sulphate added continuously or otherwise as may be necessary to maintain the composition of the reaction liquor substantially constant. Additions of mercury sulphate catalyst at approximately the rate of 200 lbs. to 300 lbs. per hour have been found satisfactory.

The mixed gas and vapor escaping from the reaction vessel is passed through any suitable condensing apparatus to separate the acetaldehyde from acetylene. The gas escaping from the condensing apparatus may also be scrubbed to recover uncondensed acetaldehyde. The cleansed acetylene may then be returned to the reaction by any suitable means. A small percentage of uncondensed aldehyde remaining in the acetylene and returning to the reaction is apparently not detrimental. Ordinarily the process would be carried out at atmospheric pressures or at such small amounts above atmospheric pressure as may be incident to the operation of the condensing apparatus and scrubber. Gas is blown to the atmosphere periodically to remove accumulated impurities. The yield of acetaldehyde obtained from the condensing apparatus is approximately the theoretically possible amount and under the conditions specified is a yield of 1500 lbs. per hour, representing a conversion of 200 cu. ft. of acetylene per minute.

The process may be carried out continuously for long periods of time, but it is to be understood that the mercury catalyst becomes reduced and accumulates in the kettles in the form of sludge, which sludge also contains complex mercury organic compounds. This sludge may be drawn off, either continuously or intermittently, at the base of the kettle and converted by suitable means into an active mercury salt, which is returned to the kettle. Sulphuric acid removed with the sludge may be replaced in whole or in part by fresh acid if the amount so removed is greater than that formed by decomposition of the mercury sulphate. If, however, the amount of acid formed is greater than the amount removed there will not be any replacement but on the contrary a further amount of acid may be withdrawn to maintain the desired solution strength.

While in the foregoing example 20% sulphuric acid solution has been mentioned, it will be understood that concentrations both lower and higher than this may be used, for example, 3% to 40% or possibly higher, the rate of reaction being to some extent effected by the acid concentration. It will also be understood that the invention is not limited to the use of sulphuric acid but contemplates the use of any acid which may be found serviceable. In addition the invention is not limited to the use of mercury oxides or salts but contemplates the use of any body which is found to have desirable catalytic properties in the reaction. It will be still further understood that the process is in no way limited to the rate of introduction of the acetylene given in the example, which is approximately 1000% excess of the combinable amount, but extends to the use of an excess of acetylene in any amount above 300% to 400% excess, i. e., four to five times the combinable rate, although the employment of excesses between 100% and 300% is contemplated. It will still further be understood that the process is not limited to any temperature or pressure nor to the agitation of the liquor solely by the acetylene, as mechanical stirring may be resorted to if desired, also external cooling as may be necessary. Any suitable combination of acid solution strength, catalyst, temperature and pressure with a great excess of acetylene, either in a continuous or intermittent process, is contemplated by and falls within the scope of the present invention.

The cost of circulating large amounts of acetylene is practically no greater than the cost of circulating a small amount and the loss, if any, is practically no greater, as the escaping excess is collected and may be returned to the reaction or otherwise employed. The great advantage derived is that the rate of production of a given plant may be greatly increased, substantially without proportionate increase in the cost of operation. The following table, which for convenience is in round numbers and therefore only approximate, based on 1000 gals. of liquor of approximately the composition cited in the example, clearly indicates the advantage of increased acetylene supply:—

| Gas supply | Acetaldehyde produced |
| --- | --- |
| Cubic feet per minute | Pounds per hour |
| 650 | 750 |
| 1300 | 1000 |
| 2000 | 1500 |
| 2500 | 1800 |
| 4000 | 2200 |

The rate of production for any given rate of circulation will vary according to the subdivision of the gas passing through the kettle. The above table is that obtained without any mechanical means of subdivision of the gas beyond the use of a conical base for the kettle. If suitable mechanical means are inserted near the base of the kettle for subdivision of the gas, the production is greatly increased for a given rate of circulation; for example, it is found that with a circulation of 1700 cu. ft. per minute a production of 2000 lbs. per hour is easily obtained if a reasonably efficient mechanical means for subdivision and distribution of the gas is inserted near the base of the kettle. The production for any given rate of circulation will also vary somewhat according to the temperature and the acid concentration.

In the production of acetaldehyde by the process outlined above, it may be found advantageous to add to the catalytic agents mentioned a material or materials which tend to retard the reduction of the mercury salt. A material found satisfactory for this purpose is ferric sulphate or similar materials. This ferric sulphate is reduced slowly and continuous addition is necessary or else it may be oxidized continuously by the use of electric current, either in the reaction liquor itself or preferably in an outside vessel to which the reaction liquor is circulated.

Having thus described our invention, what we claim is:—

1. In a process of manufacturing acetaldehyde by interaction of acetylene and water, the feature of supplying the acetylene at a rate more than four times the rate of its absorption.

2. A process of making acetaldehyde which includes passing acetylene gas into an aqueous acid solution containing a catalyst, the acetylene being passed through the reaction liquid at a rate more than four times the rate of absorption.

3. A process of making acetaldehyde which includes passing acetylene gas into an aqueous solution of sulphuric acid in presence of a mercury compound as catalyst, the acetylene being passed through the reaction liquid at a rate more than four times the rate of absorption.

4. A process of making acetaldehyde which includes passing acetylene gas into an aqueous acid solution containing a catalyst at a rate at least ten times the rate of absorption.

5. A process of making acetaldehyde which includes passing acetylene gas into an aqueous solution of sulphuric acid in presence of a mercury compound as catalyst at a rate at least ten times the rate of absorption.

6. In a process of manufacturing acetaldehyde, the feature of supplying acetylene at a rate more than twice the rate of absorption.

In witness whereof, we have hereunto set our hands.

HUGH S. REID.
WALDO C. HOVEY.